Figure 14:
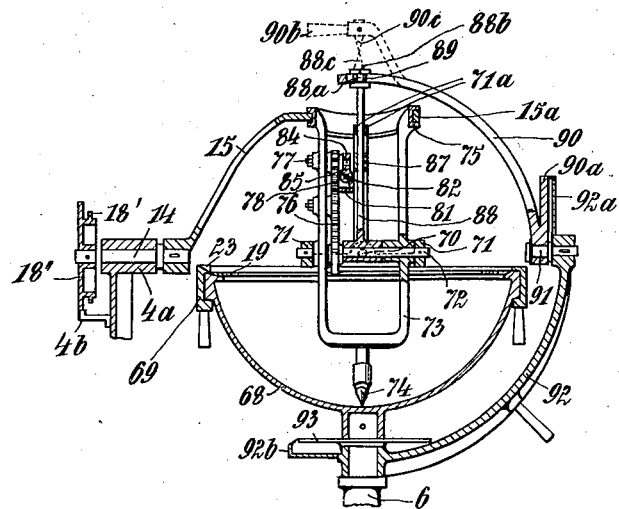

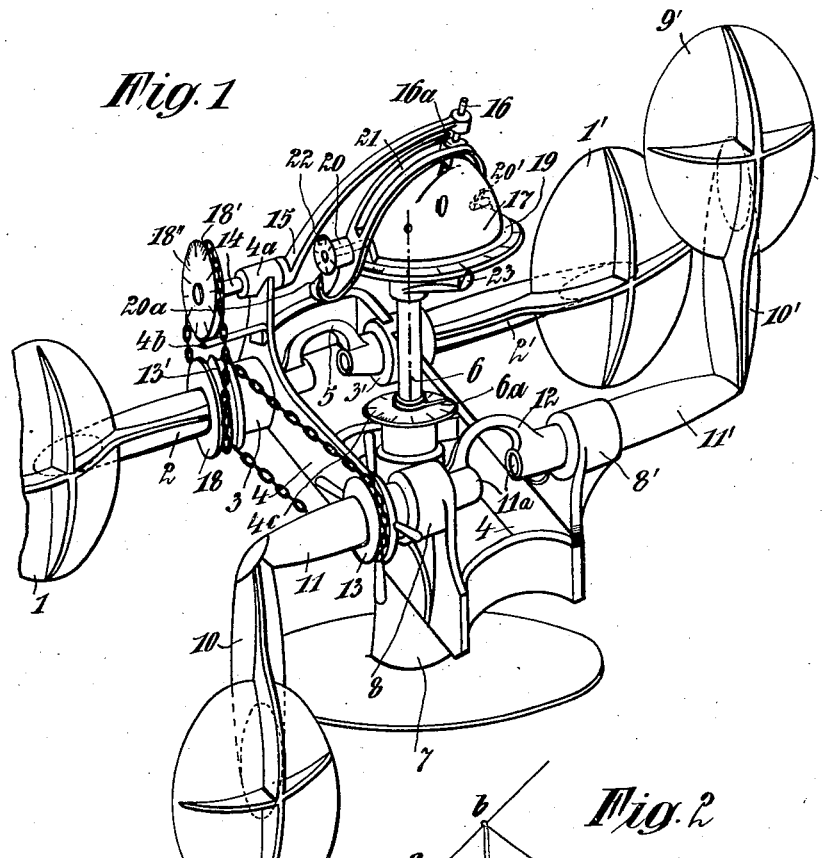

May 6, 1930. K. PETSCHENIG 1,757,874
APPARATUS FOR DETERMINING THE COURSE OF AIRCRAFT
Filed Jan. 6, 1928 4 Sheets-Sheet 2
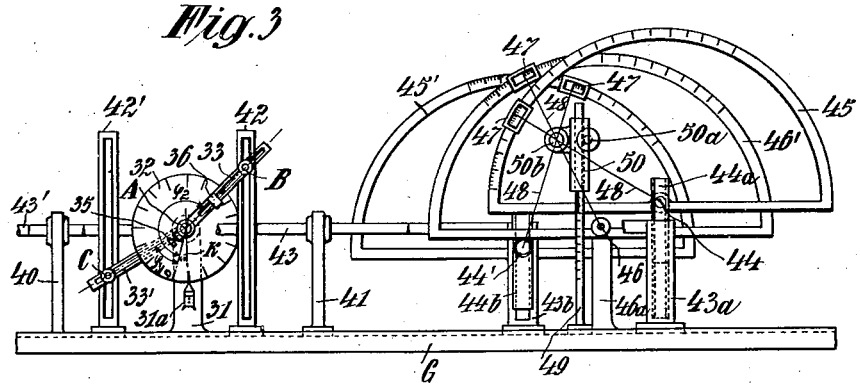
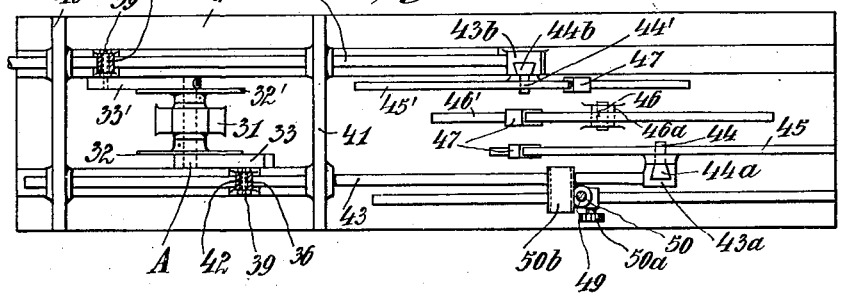
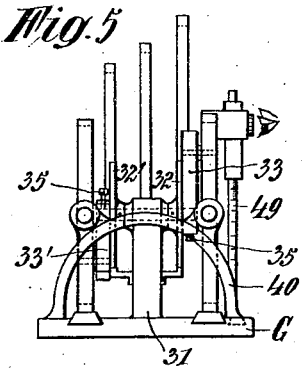
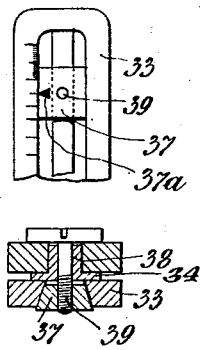

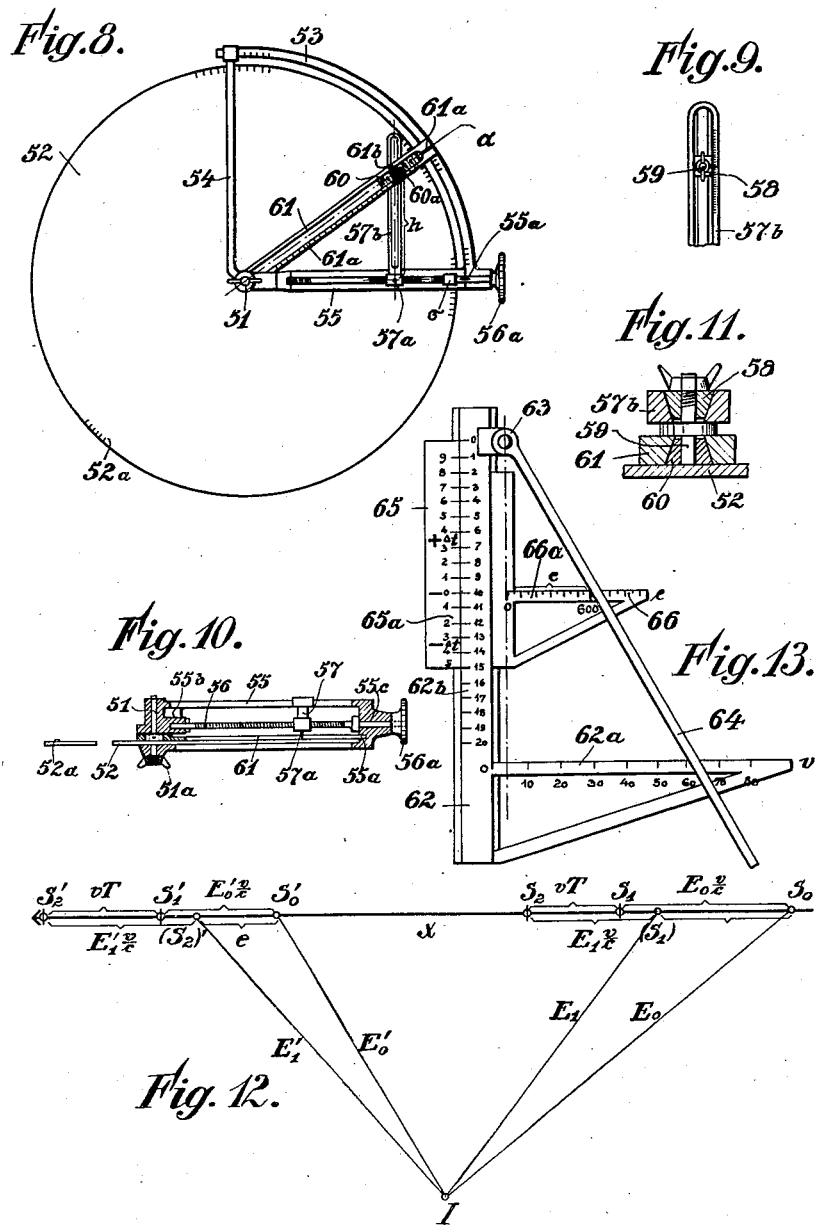

May 6, 1930.　　　　　K. PETSCHENIG　　　　　1,757,874
APPARATUS FOR DETERMINING THE COURSE OF AIRCRAFT
Filed Jan. 6, 1928　　　4 Sheets-Sheet 4

Patented May 6, 1930

1,757,874

UNITED STATES PATENT OFFICE

KARL PETSCHENIG, OF VIENNA, AUSTRIA, ASSIGNOR TO THE FIRM C. P. GOERZ OPTISCHE ANSTALT AKTIENGESELLSCHAFT, AKCIOVA SPOLECNOST K. P. GOERZ OPTICKY USTAV, OF BRATISLAVA, CZECHOSLOVAKIA

APPARATUS FOR DETERMINING THE COURSE OF AIRCRAFT

Application filed January 6, 1928, Serial No. 244,993, and in Germany May 6, 1927.

The object of my invention is to provide an apparatus for determining the instantaneous position, direction of movement, and speed of invisible air crafts by an analysis of the sound issuing from the plane by exclusively acoustic means, that is to say without the aid of search lights, telescopes or other optical instruments, it being assumed that the flight is uniform and rectilinear in a horizontal plane.

The actual instantaneous position of a moving source of sound is of course different from that of the point at which the sound waves observed at the observation instrument had been produced, since the propagation velocity of sound waves is comparatively low, only about three times the speed of flight of modern air crafts, and the source of sound continues its comparatively very rapid flight during the time the sound waves require for reaching the point of observation. Therefore, owing to this period necessitated by the propagation of sound and called lag of sound, the direction of the sound rays arriving at the observation station makes an angle with the radius leading to the instantaneous position of the source of sound and practically coinciding with the optical radius of observation, which angle is called acoustic parallax and which depends not only on the speed of the source of sound but also on the angle of altitude of the arriving rays of sound, on the distance and on the direction of movement of the source of sound.

The instantaneous position in space, the direction and the speed of movement of an invisible source of sound are determined according to the present invention by providing three observation stations distant from each other and forming the corners of a base triangle on the ground, one of such stations being selected as the central station, each comprising suitable acoustic observation means permitting the observer at such station to readily and exactly adjust the acoustic axis of the observation means to the direction of the arriving sound rays and to read off the angle of altitude and azimuth relatively to a given horizontal direction of the sound rays arriving from the source of sound observed and also to mechanically determine by means of successive observations of the direction of arriving sound waves the plane passing through two successive positions of the acoustic axis of the said observation means. The position in space of this sound ray plane being defined by its inclination to the horizontal plane and by the angle of inclination of its line of intersection with the horizontal plane relatively to the said given horizontal direction, say the north direction, and this latter angle is called the flight angle. The three angles of inclination and the angle of flight common to the observation stations are then transmitted to corresponding circles provided with divisions of an apparatus located in the said central observation station and having the centres of such circles arranged in points exactly representing the positions of the corners of the said base triangle on a suitable scale say that of a map and the point of intersection of the three sound ray planes indicates the linear height of the line of flight of the air craft above the ground by suitable means. From the linear height of the air craft above the ground thus determined and from the altitude and azimuth direction of sound rays observed by the observation means at the central observation station not only the horizontal projection of the exact acoustic position of the source of sound may be determined by a suitable apparatus for solving triangles but also the direct distance E from the central observation station and therefore also the lag of sound itself $$\left(t = \frac{E}{333} \text{ in seconds of time}\right).$$

If now at the beginning and at the end of any measuring period T the position of the horizontal projection of the acoustic position of the source of sound has been determined it will be found that the two projections are distant from each other say by $e$ metres corresponding to a certain change ($\Delta t$ in seconds of time) in the lag of sound. This change in the lag of sound depends in the first place of whether the source of sound approaches the observation station or moves away therefrom. It will be readily understood that the speed of the source of sound is determined by the relations $$v = \frac{e}{T + \triangle t}$$

for approaching and $$v = \frac{e}{T - \triangle t}$$

for receding sources of sound.

On the ground of this relation the speed of the source of sound may be readily found by a simple mechanical apparatus and may then be plotted on a suitably reduced scale to the speed division of the indicating apparatus for the true or optical position of the source of sound. This apparatus is so constructed that a mechanical rectangular triangle having one side of constant length to which the second permanently horizontal side of a length proportional to the speed of the source of sound is connected, is permanently mechanically adjusted into the plane of the rays of sound by continuous observation of the direction of the rays of sound whereby the point of the extension of the third side which is inclined to the first side at the angle of the acoustic parallax indicates in the said plane the instantaneous optical position of the source of sound. By providing a following pointer pivoted by a universal joint to the corner of the triangle opposite the horizontal speed side thereof, such corner being the centre of the projection sphere and continuously keeping the said following pointer in coincidence with the point of the third side, the angles of altitude and of azimuth of the point of this following pointer may be immediately read as those of the central projection of the true optical position of the source of sound and the data may be transmitted, if desired, by suitable transmitting means to other apparatus. If for instance a telescope or a search light were adjusted to the angles of altitude and azimuth of the point of the said following pointer, the source of sound, if visible at all, would appear in the field of vision of the telescope or in the pencil of rays of the search light.

Various constructional forms of the subject matter of my invention are illustrated by way of example in the accompanying drawing.

Figure 15:
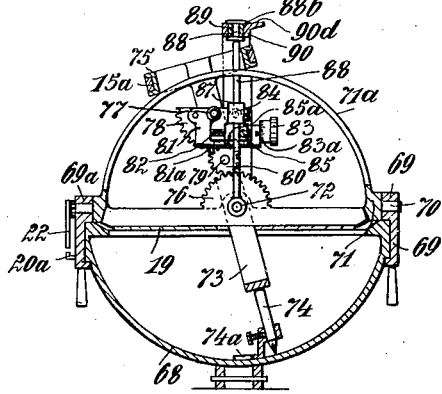

Fig. 1 is a diagrammatical perspective view of the sound observation instrument. Fig. 2 illustrates diagrammatically the geometrical method of determining the linear height of the source of sound above the ground by means of the angles of inclination of the planes of rays of sound and of the given angle of flight. Figs. 3, 4 and 5 show in front elevation, plan view and side elevation respectively the mechanical apparatus for determining the linear height of the source of sound above the ground by means of the method illustrated by Fig. 2. Figs. 6 and 7 show details of the mechanical apparatus shown in Figs. 3 to 5. Fig. 8 is a plan view and Figs. 9, 10, and 11 are details of a mechanical apparatus for determining the acoustic measuring length of the source of sound and of the change of the lag of sound during the measuring period by means of the height and direction of flight and of the angles of altitude and azimuth of the position of the source of sound as previously determined. Fig. 12 illustrates the relations between the duration of the measuring period of the change of the lag of sound and the acoustic measuring length, Fig. 13 shows an apparatus based on the geometrical relations illustrated in Fig. 12 for determining the speed of movement of the source of sound. Fig. 14 is a front elevation partly in section and Fig. 15 is a side elevation partly in section of an apparatus associated to the acoustic observation apparatus for determining the instantaneous position of the source of sound from the acoustic position of such source, its speed and of the plane of sound rays.

In Fig. 1 the two paraboloidal sound receiving reflectors 1, 1' having parallel geometrical axes and serving for determining the azimuth of the plane of sound rays are each provided with an ellipsoidal sound conveying reflector 2, 2' arranged confocally to the associated paraboloidal sound reflectors 1, 1'. These ellipsoidal reflectors 2, 2' are each rotatably mounted in a bearing 3, 3' in a frame 4 the two bearings being coaxial and the two ellipsoidal sound reflectors being rigidly connected by a yoke 5. The said frame 4 is rotatably mounted on a fixed vertical shaft 6 of a tripod or other suitable support 7, and is provided with two bearings 8, 8' having in common an axis parallel to that of the bearings 3, 3'. The bearings 8, 8' carry the second set of sound receivers serving to determine the angle of altitude of the sound rays and consisting of two paraboloidal receiving sound reflectors 9, 9' the geometrical axes of which are parallel to each other. These sound receiving reflectors 9, 9' are rigidly and confocally connected to ellipsoidal sound conveying reflectors 10, 10' which in turn are rigidly and confocally connected to sound conveying reflectors 11, 11' rigidly connected to each other by a yoke 12. In order to keep parallel to each other the acoustic axes of the two sets of sound receivers, that is to say the geometrical axes of the sound receiving paraboloids, the two sound conveying reflectors 2 and 11 having parallel geometrical axes are coupled with each other by chain and sprocket wheel gearing, the sprocket wheels 13, 13' being equal in diameter. A shaft 14 parallel to the said two horizontal axes is journalled in a bracket 4ª on the frame 4 in such a manner that the line of its axis passes through a point O of the vertical axis 6. To the shaft 14 an arcuate arm 15 is secured which carries a pencil 16 radial to the point of intersection O which is the centre of a hemisphere 17 secured to the vertical axis 6. The pencil 16 is arranged to draw lines on the surface of the said hemisphere. The shaft 14 is rotated by means of a chain and sprocket wheel gearing 18, 18′ through the same angles as the horizontal ellipsoides and the angle of altitude of the ray of sound existing at any time may be read on a division provided on the sprocket wheel 18 and a pointer 18′′ secured to the bearing frame. The arm 15 is so arranged that when the acoustic axis is exactly vertical the pencil 16 is in the zenith of the hemisphere 17. For the sake of clearness the pencil had to be shown in the drawing in another position. On the equator of the hemisphere a ring 19 provided with a division is mounted to rotate in a horizontal plane. This ring is provided with two trunnions 20, 20′ on which is rotatably mounted a semi-circular slotted yoke 21. In this slot a slide 16$^a$ rotatably mounted on the pencil 16 is guided. One of the trunnions 20, carries a circle 22 provided with a division on which by means of a pointer 20$^a$ secured to the yoke 21 the angle of inclination of the yoke 21 existing at any time may be determined. This angle depends on the position of the pencil 16 and therefore on the angle of altitude of the ray of sound and of the azimuth of the axis of the yoke 21 which may be read on the division of the ring 19 by means of a pointer 23 carried by the shaft 6.

The operation of this sound observation apparatus or means is the following: An attendant, the azimuth observer, keeps his ears at the inner ends of the azimuth sound receiver structure 1, 1′, 2, 2′ effects the adjustment for the azimuth angle of the sound ray by turning the frame 4 according to his sound observation. The azimuth angle can be read on a circular division 4$^c$ on the frame 4 concentric to the shaft 6 by means of a pointer 6$^a$ fast on this shaft. At the same time another attendant, the altitude observer keeping his ears at the inner openings 11$^a$ of the altitude sound receiver structure 9, 9′, 10, 10′, 11, 11′ effects the adjustment for the angle of altitude of the sound ray by turning according to his sound observation the sprocket wheel 13 by means of handles provided thereon. This movement of the sprocket wheel is transmitted not only to the azimuth sound receivers but also to the pencil 16. The latter thus draws on the hemispherical surface a great circle, provided the source of sound moves in a straight line such great circle indicating the line of intersection of the plane of the rays of sound with the hemispherical surface. If now a third attendant so turns the equator ring 19 that a direction indicator fast on the slide moving in the slot of the yoke 21 and on the hemispherical surface is in the direction of the line drawn, then the yoke 21 is adjusted into the plane of the rays of sound and the angle read on the division of the vertical circle 22 indicates the angle of altitude of the plane of the rays of sound while the azimuth of the axis of the trunnions 20, 20′ read on the horizontal circular division 19 defines the line of intersection of the plane of rays of sound with the horizon that is to say the azimuth angle of the line of flight of the moving source of sound. Besides these two data of the plane of the rays of sound also the angle of altitude of the acoustic position may be read on the division 18 and its azimuth on the horizontal division 4$^c$.

Now according to the invention there are provided three observation stations I, II, III forming the corners of any triangle on the ground as shown in Fig. 2. In these three observation stations the angles of inclination $V_1$ $V_2$ $V_3$ of the planes of rays of sound and the angle K of the direction of flight common to all the stations relatively to a given horizontal direction are selected once forever. Assuming now that these three planes the lines of intersection of which with the horizontal plane are parallel to each other pass through the points I, II, III, then these three planes will intersect in a horizontal straight line $a, b, c$ namely the straight horizontal line of flight of the source of sound in space which is parallel to the lines I$^x$, II$^x$, III$^x$.

If for instance I is selected as the central station and if the triangle I, II, III is drawn on a horizontal plane passing through the station I the horizontal base triangle I II′ III′ is obtained which is determined by the length of the three sides I II′, III′ and by their angles $\varphi 2$, $\varphi 3$. Passing moreover through I a vertical plane perpendicular to the line of flight this plane intersects the straight lines II$^x$, III$^x$ in the points II′′ III′′ and the vertical triangle I II′′ III′′ is obtained which intersects the line of flight in the point $a$ the line I$^a$ being inclined to the horizontal at the angle of inclination. The linear height sought of the line of flight of the source of sound above the horizon of the central station is thus represented by $a'$ if I is the horizontal line through I perpendicular to the direction of flight I$^x$. By projecting on this latter the points II′′ III′′ the points (II)(III) are obtained which indicate the difference of the levels $h_2$=II′′ (II) and $h_3$=III′′ (III) of the two other stations relatively to the central station.

For mechanically determining the linear height $a'$ sought, first of all the horizontal base triangle I II′ III′ is constructed according to Figs. 3 to 7 in the following manner: In a standard 31 a shaft A is rotatably mounted, on which, on either side of the standard discs 32, 32′ provided with circular divisions are fixedly mounted and on which outside discs crank arms 33, 33' are provided which may be locked against rotating by screws 35, 35'. Each of the crank arms has a dovetailed radial slot provided with a longitudinal division and carries a pointer mark 36 for adjusting the crank arms according to the angles $\varphi 2$, $\varphi 3$ of the base triangle relatively to the zero point of the scale disc 32 and each of the crank arms carries a slide 37 movable in its slot which slide may be locked in the hollow stud 38 by means of the screw 38. The slide 37 carries a pointer mark $37^a$ for adjusting the centre of the hollow stud relatively to the axis of the crank arm bearing by means of the radial flange $34^a$. The centres B and C of the two hollow studs 38 adjustable according to the angles $\varphi 2$ $\varphi 3$ and the distances of the bearings corresponding to I, II' and I, III' represent the two stations II' and III' of the horizontal base triangle I II' III'. The angle K of the line of flight read at 19—23 may be taken into account by adjusting the discs 32 and 32' according to this angle with respect to the pointer $31^a$ secured to the standard 31 on the circular division of the disc 32 relatively to the zero point of the same, in order to mechanically represent also the vertical base triangle I II'' III'', the horizontal distances I (II) and I, (III) Fig. 2 are transmitted by shifting in the direction of the line of flight of the source of sound two guide bars 42, 42' vertically slotted and movable at right angles thereto in the guides 40, 41 owing to the engagement of the hollow studs 38 and through the medium of the push bars 43, 43' to the centres 44, 44' of two semicircles 45, 45' provided with divisions. These centres may be adjusted to the differences in level $h_2$ $h_3$ (Fig. 2) by means of the slides $44^a$, $44^b$ guided on and adapted to be locked to vertical arms $43^a$, $43^b$ of the push bars. The horizontal distance of the centres of the said semi-circles from the associated slots of the slotted bars 42, 42' is equal and equal to the distance of the axis A from the fixed centre 46 of a third or central semi-circle 46' mounted on the standard $46^a$. On the periphery of each of the semicircles is provided a pointer mark 47 adapted to be locked in any position for adjusting the associated angles of inclination $V_1$ $V_2$ $V_3$ of the sound ray planes read at $20^a$, 22. As shown a fine steel wire 48 connected radially and rotatably to the centre of the associated semicircle serves as an adjusting mark.

The base plate G is provided with two parallel grooves for guiding the two vertical arms $43^a$, $43^b$ of the push bars and furthermore with a third parallel groove for guiding the movable standard 49 on which a sleeve 50 locked against rotary movement may be adjusted vertically by a rack and pinion gearing $50^a$. This sleeve carries the diopters $50^b$ by means of which the exact common crossing point of the three wires 48 may be exactly sighted by moving laterally the diopter standard 49 and vertically adjusting the sleeve 50. For reading the height adjusted of this crossing point as a mechanical representation of the point of intersection of the line of flight $b^x$ of the source of sound with the plane I II'' III'' perpendicular thereto passing through the central station a vertical division is provided on the diopter standard 49 while the bottom edge at the sleeve 50 may serve as the pointer. From the linear height $H = aa'$ of the line $b^x$ of flight of the source above the horizon of the central station I and from the angle of altitude $\alpha$ read on the division 18'' and pointer 18' and from the azimuth angle $\delta$ (read on the division $4^c$ by the pointer $6^a$, both at the central station the position of the horizontal projection and the distance of the acoustic locus of the source of sound is determined by the following apparatus shown in Figs. 8 to 10.

52 is a transparent disc of celluloid or other suitable material and on the axis of this disc the altitude angle quadrant 53 is rotatably mounted by means of arms 54, 55. The arm 55 carries a pointer $55^a$ for adjusting the azimuth angle of the acoustic position of the source of sound and furthermore carries the bearing $55^b$, $55^c$ of a screw spindle 56 for adjusting radially a nut $57^a$ slidably mounted in the arm 55 and prevented from rotating therein. This nut carries a pointer 57 sliding along the disc 52 and a slotted guide $57^b$ provided with a longitudinal division. In this guide is guided a slide 58 provided with a pointer mark. In this slide a screw having a thumb nut is mounted. On this screw a slide 60 is rotatably mounted which is guided in the slotted radial arm 61 rotatably mounted on the hub of the disc 52. This arm carries a pointer mark $61^a$ for adjusting the altitude angle of the acoustic position of the source of sound on the division of the quadrant 53. The radial arm 61 carries a division $61^a$ on which the direct distance of the position of the source of sound may be read by means of a pointer mark $60^a$ provided on the slide 60. The adjustment for the altitude angle is effected by horizontally shifting the screw nut 57 that is to say by rotating the disc $56^a$ secured to the screw spindle 56 after the linear height of the position of the source of sound already determined has been adjusted on the guide $57^b$ by locking the slide 58.

For determining the change of the lag of sound during any selected period of time the slide 60 is provided on either side of the pointer mark $60^a$ with a time division based on the following principle.

Assuming that I in Fig. 12 is the central station, $So$ the position of the source of sound at the time of sending out sound waves, $Sox$ the horizontal line of flight in any given plane of rays of sound, $Eo$, the direct distance of the source of sound approaching the central station from the latter, $v$ the speed of the source of sound in metres per second and $c=333$ metres per second the velocity of propagation of sound waves then the lag of sound is $to = \frac{Eo}{c}$. In the time interval to the source of sound reaches the point $S_1$, the distance $SoS_1$ being $v\, to = \frac{v}{c} Eo$, so that $S_1$ is the true position of the source of sound at the moment when the sound is observed. If at this moment the measuring of the speed is commenced, then after a selected measuring period of $T$ seconds the source of sound will be at $S_2$, $S_1 - S_2$ being equal to $vT$. If during the measuring period the source of sound is continuously kept in the acoustic axis of the observation instrument then at the end of the measuring period it will be acoustically observed in a point $(S_1)$ which is at a distance $E_1$ from the station I that is to say is in rear of the true position $S_2$ by a distance $E_1 \frac{v}{c}$ and is displaced relatively to the initial position of the source of sound by a distance $e$. From Fig. 12 it follows:

$$SoS_2 = Eo\frac{v}{c} + vT = E_1\frac{v}{c} + e.$$

Hence $$T = \frac{e}{v} - \frac{Eo - E_1}{c}.$$

Now $\frac{Eo - E_1}{c}$ is the change of the lag of sound to $-t_1 = \Delta t$ and consequently $$T + \Delta t = \frac{v}{c} \text{ and hence } v = \frac{c}{T \div \Delta t}.$$

Similarly a source of sound $S'o$ moving away from the station I, the initial distance of which from this station is $E'o$ will have reached the point $S'1$ at the moment when the sound waves sent out at the beginning of the measuring period from the point $S'o$ are observed at the station I and at the end of the measuring period. The source of sound will have reached the point $S'2$ but will be observed acoustically at $(S'2)$ in the distance $E'1$ from the station I.

The equation $$S'oS'2 + E''o\frac{v}{c} + vT = E'_1\frac{v}{c} + e$$

gives $$T = \frac{e}{v} + \frac{E'_1 - E'o}{c} = \frac{e}{v} + \Delta t$$

and hence $$T - \Delta t = \frac{e}{v} v = \frac{e}{T - \Delta t}.$$

For determining the lag of sound $\Delta t$ the slide 60 is provided on either side of its pointer mark with a longitudinal scale which scales owing to their radial position would indicate direct changes of distances if they were divided by units of length. To each unit of length, considered as a distance through which sound is propagated, corresponds a fully defined duration of propagation of sound so that the longitudinal division only need be properly numbered to indicate the changes of lag of sound $\Delta t$ sought, if after adjusting $\theta$, $\alpha$ and H at the beginning of the measuring period on the radial guide 61 a mark line 61$^b$ is drawn according to the position of the pointer mark 60$^a$ while at the end of the measuring period after readjusting of $\theta$, $\alpha$ and H the time corresponding to this mark line may be read on the slide 60. At the same time by marking the position of the pointer mark 57$^a$ on the celluloid disc 52 the change in position $e$ of the source of sound having taken place during the measuring period and required for measuring the speed may be measured by means of a rule scale.

For mechanically determining the speed of the source of sound preferably an apparatus as shown in Fig. 13 may be used which consists substantially of a structure 62 comprising two rules 62$^b$, 62$^a$ at right angles to each other a rule 64 hinged at 63 to one of the rules 62$^b$, and a slide 66. The rule 62$^a$ carries a speed scale while the other rule 62$^b$ of the rectangle carries a scale of measuring periods and serves as a guide for the slide rule 65 which carries the scale 65$^a$ for the changes of the lag of sound $\Delta t$, the part of the scale 65$^a$ on one side of its zero point serving for the lags of sound $\Delta t$ for sources of sound approaching the observation station and the part of the scale 65$^a$ on the other side of the zero point serving for the lags of sound $-\Delta t$ for sources of sound moving away from the observation station. To this slide 65 is rigidly connected a rectangle 66 65$^a$ with a scale 66$^a$ perpendicular to the scale passing through the zero point of this scale 65$^a$ and numbered by distances to be measured.

The way of using this device is very simple. If for instance the measuring period for approaching sources of sound is 8 seconds and if by the apparatus shown in Figs. 8 to 10 the change of lag of sound $\Delta t$ has been found to be 2 seconds, the length of the path $e$ of the source of sound as found by the acoustic means being 600 metres, the slide 65 is so adjusted that division line corresponding to $\Delta t = 2$ seconds coincides with the division line of the measuring period scale 62$^a$ corresponding to $T = 8$ seconds. The hinged rule 64 is then so adjusted as to intersect the scale 66$^a$ at the division line corresponding to $e = 600$ metres. Then this hinged rule intersects the speed scale 62$^a$ at a division line corresponding to $v = 60$ metres. The same way of adjusting the slide is used for sources of sound moving away from the observation station, for instance for a measuring period T of 13 seconds and a lag of sound $\triangle t$ of 3 seconds or for sources of sound moving at right angles to the direction of the sound rays or moving around the observation station. In this latter case the lag of sound is constant and consequently $\triangle t = 0$ and the measuring period T may be 10 seconds.

After the speed $v$ of the source of sound has been determined in the manner just described the true or optical position of the said source may be determined for which purpose the apparatus shown in Figs. 14 and 15 is particularly suitable. This apparatus is mounted on the shaft 6 of the central station in line of the apparatus 16 to 23 shown in Fig. 1. The equator of the hemisphere 68 secured to the shaft 6 of the tripod of the sound observation instrument serves as a guide for the horizontal ring 69 provided with handles. This ring carries the diametrically opposite bearings $69^a$ for the horizontal trunnions 70 of a supporting frame 71 provided with a semi-circular yoke $71^a$ having a central slot located in the plane of the trunnions and extending nearly to the latter. In this supporting frame a shaft 72 is fixedly mounted which is perpendicular to the plane of the said trunnions and slot and on which a bifurcated arm 73 is rotatably mounted. This arm carries at its outer end a pencil 74 the point of which extends to the inside of the hemisphere 68. The upper end of this bifurcated arm carries a ring U shaped in transverse section in which a second ring $15^a$ is rotatably mounted. This ring $15^a$ is secured to the arcuate arm 15 of Fig. 1 fixed on the shaft 14 journalled in the bracket $4^a$ of the frame 4. A spur wheel segment 76 concentric to the shaft 72 is fixedly mounted in the supporting frame 71 and is coupled with another spur wheel segment 78 of equal radius rotatably mounted on a shaft 77 journalled in the bifurcated arm 71 by means of an intermediate spur wheel 80, also rotatably mounted on a shaft 79 journalled in the bifurcated arm 71. This connection has for its result that any straight line drawn on the segment 78 remains parallel to itself notwithstanding any rotary movement of the bifurcated arm 71 around its shaft 72. The toothed segment 78 carries the bearings 81 of a horizontal screw 82. By rotating this screw by means of the knob 83 the nut 85 may be moved horizontally which is provided with a bearing 84. Into this bearing engages a journal pin secured to a sleeve 87. This horizontal movement of the nut may be exactly determined by means of a pointer mark $85^a$ and a unit scale on the screw bearing 81 and a fraction scale $83^a$ on the knob 83. An arm 88 rotatably mounted on the shaft 72 is guided on the sleeve 87 and in the slot of the semi-circular yoke $71^a$. This radial arm 88 carries at its outer end a pin $88^a$ guided by means of a slide 89 in the middle slot of quadrant 90 concentric to the hemisphere 68. This quadrant is rotatably mounted on the horizontal journal pin 91 and the latter is secured to a curved arm 92 rotatably mounted on the shaft 6 and provided with a handle.

The vertical turning of the quadrant 90 may be read by means of the circular division $90^a$ and the pointer $92^a$ and its turning in the horizontal plane may be read by means of the pointer $92^b$ and the circular division 93 secured to the shaft 6. A pointer mark $88^b$ is provided on the trunnion $88^a$ and coincides nicely with a pointer mark $90^c$ provided on the quadrant 90 when the radial arm 88 is exactly vertical. At any other position of the arm 88 the coincidence of the two pointer marks may be brought about by properly turning the curved arm 92 around a vertical axis, since thereby the quadrant 90 is also positively turned around the journal pin 91 through the medium of the guiding slot. Instead of the pointer marks also pointers might be used, one of which $88^e$ is provided on the radial arm and the other on the $90^e$ on the quadrant 90. In this case the coincidence of the pointers is not brought about positively since the guiding by the slot of the radial arm 88 in the quadrant 90 may be dispensed with, but the pointers are brought to coincidence by operating the two handles $90^b$ and $92^b$.

The operation of this apparatus is as follows:

The invisible source of sound is continuously observed by the acoustic observation instruments shown in Figs. 1 and 14 and 15 such instruments being located at three observation stations on the ground forming the corners of a triangle, one of such stations being the central station, the acoustic axes of the observation instruments being continuously held in the direction of the sound rays coming from this source of sound. At some moment before the beginning of the measuring period the angle K of the line of flight is read on the horizontal divided circle 19 and the angle of inclination $v$ of the plane of rays of sound on the vertical circle 22. These data are utilized in the central station by determining the linear height of the source of sound above the ground. For this purpose first the triangle formed by the observation stations is represented on the scale of a map by the apparatus shown in Fig. 3 by means of the studs B and C adjustable radially and circumferentially relatively to the stud A so that A B C represents the horizontal projection of the natural base triangle. Then the division of the disc 32 or 32′ is adjusted to the angle of flight K common to the three stations by means of the pointers $31^a$. Owing to the engagement of the two hollow studs 38 corresponding to B and C into the slotted transverse arms 42, $42^a$ of the two horizontal push bars 43, 43′ the latter are moved with the circles 45, 45′ relatively to the stationary circle 46' corresponding to the central station in such a manner that the horizontal distances of the centres correspond to the distances of the projections of the points B and C from that of point A on a plane perpendicular to the line of flight. If now the angles $v_{1'}$, $v_{2'}$, $v_{3'}$ determined at the three stations are adjusted on the associated circles by means of the slides 47, then by means of the diopter 50$^b$ the linear height of the crossing point common to the radial pointers 48 above the centre 46 of the circle 46' may be determined and thus the linear height H of the source of sound above the level of the central station may be found. As soon as the way $e$ has been determined through which the acoustic locus of the source of sound has moved in a selected measuring period T the speed of the source of sound and the corresponding lag of sound $\Delta te$ may be determined by means of the apparatus shown in Figs. 8 to 11. This is done by adjusting at the central station at the beginning and at the end of the measuring period T the angles 6 on the circular division 52$^a$ by means of the pointer mark 55$^a$ and furthermore adjusting on the division 53 the angle altitude $\alpha$ by means of the pointer mark 61$^a$. The latter is done after adjusting the linear height H on the height divisions of the slotted arm moving the latter parallel to itself by the handle 56$^a$. Then the way $e$ of the acoustic locus of the source of sound is found by measuring the distance between the positions of the pointer mark 57$^a$ marked on the celluloid disc 52 at the beginning and at the end of the measuring period. At the same time the change of the lag of sound $\Delta te$ is determined on the division of the slide 60 as hereinbefore described and from T, $\Delta t$ and $e$ the speed of the source of sound is mechanically determined by the device Fig. 13. The speed $v$ thus found is adjusted on an appropriate scale on the division 81$^a$, 83$^a$ the acoustic axis of the acoustic observation instrument being continuously kept in the direction of the rays of sound coming from the source of sound. According to the great circle drawn by the pencil 74 on the hemisphere 68, and representing the central projection of the rectilinear line of flight of the source of sound the plane passing through the centre of the hemisphere the point of the pencil and the point or the pointer mark of the radial arm is turned into the plane of the rays of sound the diopter mounted on the pencil and locked in the said plane being brought to coincidence with the line drawn by rotating the ring 69 in a horizontal plane. Thereby the line determined by the centre of the hemisphere and the pointer or pointer mark of the radial arm is brought into the direction of instantaneous true or optical locus of the source of sound. After the direction indicated by the coincidence of the points or pointer marks 88$^b$ or 88$^c$ and 90$^c$ may be ascertained by reading the angle of altitude at 90$^a$, 92$^a$ and the azimuth at 92$^b$, 93, or this direction may be transmitted to suitable apparatus such as search lights or telescopes by appropriate transmitting apparatus.

What I claim is:

1. An apparatus for determining the instantaneous position of an invisible moving source of sound comprising means for mechanically representing, on a reduced scale, the triangle formed by the central observation station, the acoustic position and the true position of the source of sound, the constant length of one side of this represented triangle representing the straight line connecting the central observation station with the acoustic position of the source of sound corresponding to the velocity of propagation of sound waves, the other side of the represented triangle representing the straight line connecting the acoustic and the true position of the source of sound corresponding to the speed of the source of sound, and the third side of the represented triangle indicating the direction from the central station to the true position of the source of sound.

2. An apparatus for determining the instantaneous position of an invisible moving source of sound comprising means for mechanically representing, on a reduced scale, the triangle formed by the central observation station, the acoustic position and the true position of the source of sound, such means including a spherical projection surface the centre of which represents the central station, the axis of two representations of two sides of the said represented triangle intersecting in the centre of the said spherical surface, means for turning the said representations around the said centre in all directions, the constant length of one side of this represented triangle representing the straight line connecting the central observation station with the acoustic position of the source of sound corresponding to the velocity of propagation of sound waves, the other side of the represented triangle representing the straight line connecting the acoustic and the true position of the source of sound corresponding to the speed of the source of sound, and the third side of the represented triangle indicating the direction from the central station to the true position of the source of sound, in combination with an acoustic observation instrument adapted to have its acoustic axis continuously held in the direction of the arriving sound rays, means for positively connecting the said side of the represented triangle corresponding to the velocity of propagation of sound waves with the said observation instrument, whereby this side of the represented triangle is continuously held in the direction of the arriving sound rays, and means for continuously keeping horizontal the side of the said triangle which corresponds to the speed of the source of sound.

3. An apparatus for determining the instantaneous position of an invisible moving source of sound comprising means for mechanically representing, on a reduced scale, the triangle formed by the central observation station, the acoustic position, and the true position of the source of sound, such means including a spherical projection surface the centre of which represents the central station and the two representations of the two sides of the said represented triangle intersecting in the centre of the said spherical surface, means for turning the said representations around the said centre in all directions the constant length of one side of this represented triangle representing the straight line connecting the central observation station with the acoustic position of the source of sound corresponding to the velocity of propagation of sound waves, the other side of the represented triangle representing the straight line connecting the acoustic and the true position of the source of sound corresponding to the speed of the source of sound and the third side of the represented triangle indicating the direction from the central station to the true position of the source of sound, in combination with an arm, and means for turning said arm around the centre of the said spherical surface in all directions, a pointer mounted on such arm, means for adjusting the altitude and the azimuth angles of the said arm whereby its pointer may be brought into coincidence with the point representing the true position of the source of sound, and means for indicating the altitude and azimuth angles of the said pointer.

4. An apparatus for determining the angle of inclination of the sound ray plane to the horizon and the azimuth of the line of intersection of such plane with the horizon comprising a sound observation instrument, means for supporting the same to turn in all directions around a point, a spherical projection surface, an arcuate arm, and means for turning said arm around the centre of such spherical projection surface, a pencil radial to the said spherical surface and carried by the said arcuate arm, means for maintaining such pencil parallel to the acoustic axis of the said sound observation instrument, a slotted semicircular yoke mounted to be manually rotated around a vertical axis surrounding the said spherical surface and to be turned around the centre of such surface in all directions, the said pencil engaging into the slot of the said yoke, whereby the slot of the said yoke is automatically brought into the plane of sound rays whenever the line drawn by the said pencil is in the direction of the slot of the said semicircular yoke.

5. An apparatus for determining the angle of inclination of the sound ray plane to the horizon and the azimuth of the line of intersection of such plane with the horizon comprising a sound observation instrument adapted to turn in all directions around a point a spherical projection surface, an arcuate arm adapted to turn around the centre of such spherical projection surface, a pencil radial to the said spherical surface and carried by the said arcuate arm, means for keeping such pencil parallel to the acoustic axis of the said sound observation instrument, a slotted semicircular yoke adapted to be turned by hand around a vertical axis surrounding the said spherical surface and adapted to turn around the centre of such surface in all directions, the said pencil engaging into the slot of the said yoke whereby the slot of the said yoke is automatically brought into the plane of sound rays whenever the line drawn by the said pencil is in the direction of the slot of the said semicircular yoke, and means for indicating the rotary movements of the said semicircular yoke around the vertical and horizontal axes.

6. An apparatus for determining the linear height of the line of movement of a source of sound above the level of a central station comprising a frame, a hollow stud journalled in such frame and provided with a circular division, two radially slotted arms rotatably mounted on the said stud and adapted to be adjusted, means for locking said arms in positions of adjustment, hollow studs radially mounted in said slots and adjustable therein, means for locking the studs in position in said slots, two parallel push bars, each being provided with a transverse slot accommodating a respective one of the two last named hollow studs, two altitude measuring circles permanently held in vertical planes, central axes for such altitude measuring circles, means for adjusting such axes vertically, means for transmitting the horizontal movements of the said push bars to the said axes, pointer marks movable circumferentially on the said altitude measuring circles, radial rectilinear mark rules extending from the said pointer marks to the centres of the axes of the associated altitude measuring circles, and means for determining the vertical distance of the horizontal line intersecting both rectilinear mark rules at right angles from a given horizontal plane.

7. An apparatus for determining the linear height of the line of movement of a source of sound above the level of a central station comprising a frame, a hollow stud journaled in such frame and provided with a circular division, two radially slotted arms rotatably and adjustably mounted on the said stud, and means for locking said arms in positions of adjustment, hollow studs radially adjustable in said slots, means for locking said studs in positions of adjustment, two parallel push bars, each being provided with a transverse slot each accommodating a respective one of the two last named hollow studs, two altitude measuring circles mounted in vertical planes, central axes for such altitude measuring circles, means for adjusting such axes vertically, means for transmitting the horizontal movements of the said push bars to the said axes, a third altitude measuring circle, an axis for such third circle in fixed horizontal and vertical relation to the first named hollow stud, pointer marks movable circumferentially on the three altitude measuring circles, radial rectilinear mark wires extending from the said pointer marks to the centres of the axes of the associated altitude measuring circles, and means for determining the vertical distance of the horizontal line intersecting all three radial rectilinear mark wires from the axis of the said third altitude measuring circle.

8. An apparatus for determining the linear height of the line of movement of a source of sound above the level of the central station comprising a frame, a hollow stud journalled in such frame and provided with a circular division, two radially slotted arms rotatably, adjustably mounted on the said stud, means for locking the arms in position, hollow studs mounted in said slots to be radially adjusted therein, means for locking the studs in positions of adjustment in such slots, two parallel push bars, each being provided with a transverse slot each accommodating a respective one of the two last named hollow studs, two altitude measuring circles permanently held in vertical planes, central axes for such altitude measuring circles, means for adjusting such axes vertically, means for transmitting the horizontal movements of the said push bars to the said axes, a third altitude measuring circle, an axis for such third circle in fixed horizontal and vertical relation to the first named hollow stud, pointer marks adapted to move circumferentially on the three altitude measuring circles, radial rectilinear mark wires extending from the said pointer marks to the centres of the axes of the associated altitude measuring circles, and means for determining the vertical distance of the horizontal line intersecting all three radial rectilinear mark wires from the axis of the said third altitude measuring circle, such last named means comprising a diopter having a horizontal optical axis and means for adjusting such diopter vertically and horizontally.

9. An apparatus for determining the acoustically ascertained movement of a source of sound and the change of lag of sound taking place during a given measuring period comprising an azimuth measuring circle, a vertical axis therefor, an altitude measuring quadrant having two radial quadrant arms and a radial mark rule, radially slotted, and rotatable around the centre of the quadrant, such quadrant being rotatable about such vertical axis, one of the quadrant arms having a radial slot therein, a longitudinally slotted rule permanently perpendicular to and supported for movement along the said slotted quadrant arm, a marking point mounted in the said radial and radially slotted mark rule, a stud parallel to the axis of rotation of the radial and radially slotted mark rule adapted to be adjusted and locked in position in the said slotted rule perpendicular to the slotted quadrant arm said stud engaging into the slot of said rotatable slotted mark rule of the quadrant.

10. An apparatus for determining the acoustically ascertained movement of a source of sound and the change of lag of sound taking place during a given measuring period comprising an azimuth measuring circle, a vertical axis therefor, an altitude measuring quadrant having two radial quadrant arms rotatable around the centre of the quadrant, said quadrant being adapted to turn round such vertical axis, a radial slot in one of the quadrant arms, a longitudinally slotted rule permanently perpendicular to and mounted for movement along the said slotted quadrant arm, a marking point mounted in the said radial and radially slotted mark rule, and adjustable stud parallel to the axis of rotation of the radial and radially slotted mark rule, means for holding the stud in positions of adjustment in the said slotted rule perpendicular to the slotted quadrant arm, a slide carrying such stud and slidably mounted in the radial slot of the said mark rule rotatably mounted on the axis of the said quadrant, and a division on the said slide.

11. An apparatus for determining the speed of a source of sound comprising a rule with a division bearing indicia indicating different speeds, a second rule perpendicular to the said speed rule provided with a division bearing indicia indicating the duration of measuring periods, a hinged rule pivoted in the zero point of the measuring period rule, a slide mounted for movement along the measuring period rule and provided with two divisions perpendicular to each other, namely a division for the lag of sound, the lines of this division being positioned to be brought into coincidence with the lines of the said measuring period division, and a second division parallel to the said speed division and positioned to adjust the hinged rule to the acoustically determined movement of the source of sound.

12. An apparatus for determining the altitude and azimuth of the instantaneous true position of a source of sound comprising a member having a hemispherical surface, a shaft adapted to rotate around the centre of said hemispherical surface, two radial arms rotatably mounted on said shaft, pointer marks mounted on said radial arms and located in a plane perpendicular to the said shaft and passing through the said member at the centre of the hemispherical surface, a link for connecting the said two radial arms, means for permanently holding the link in horizontal position, the effective length of such link being adjustable to the speed of the source of sound, a fork and a marking pencil carried by one of the said arms, a stud on such fork, a slide adapted to move along the other radial arm, and a stud adjustable along a groove in such slide, the said link engaging with the said two studs.

13. An apparatus for determining the altitude and azimuth of the instantaneous true position of a source of sound comprising a member having a hemispherical surface, a shaft mounted to rotate at the centre of such hemispherical surface, two radial arms rotatably mounted on said shaft, pointer marks mounted on said radial arms located in a plane perpendicular to the said shaft and passing through the centre of the hemispherical surface, a link for connecting the said two radial arms, means for permanently holding the link in horizontal position, said means comprising a fixed pinion, a rotatable pinion, and an intermediate pinion permanently meshing with these two pinions, the effective length of such link being variable according to the speed of the source of sound, and a fork and a marking pencil carried by one of the said arms, a stud on said fork, a slide mounted for movement along the other radial arm and having a groove therein and a stud adjustable mounted groove in said slide, the said link engaging with the said two studs.

14. An apparatus for determining the altitude and azimuth of the instantaneous true position of a source of sound comprising a member having a hemispherical surface, a shaft mounted to rotate at the centre of such hemispherical surface, two radial arms rotatably mounted on said shaft, pointer marks mounted on such radial arms and located in a plane perpendicular to the said shaft and passing through the said member at the centre of the hemispherical surface, a link for connecting the said two radial arms, means for permanently holding the link in horizontal position, the effective length of such link being variable according to the speed of the source of sound, a fork and a marking pencil carried by one of the said arms, a stud on such fork, a slide mounted to move along the other radial arm and having a groove therein, and a stud adjustable in the groove in said slide, the said link engaging with both of the said studs, a pointer mark on the said other radial arm, said pointer mark being positioned in the direction of the centre of the hemispherical surface and the true instantaneous position of the source of sound, a pointer mark mounted for free rotation in all directions around the centre of the hemispherical surface and adjustable to be brought into coincidence with the pointer mark on the said other radial arm, and means for indicating the altitude and azimuth of the said freely rotatable pointer mark.

15. An apparatus for determining the altitude and azimuth of the instantaneous true position of a source of sound comprising a member having a hemispherical surface, a shaft adapted to rotate at the centre of such hemispherical surface, two radial arms rotatably mounted on said shaft, pointer marks mounted on said radial arms and located in a plane perpendicular to the said shaft and passing through the centre of the hemispherical surface, a link for connecting the said radial arms, means for permanently maintaining the link in horizontal position, the effective length of such link being variable according to the speed of the source of sound, a fork and a marking pencil carried by one of the said arms, a stud on said fork, a slide mounted to move along the other radial arm and having a groove therein, and a stud adjustable along the groove in said slide, the said link engaging with the said studs, a pointer mark on the said other radial arm, such pointer mark being positioned in the direction of the centre of the hemispherical surface and the true instantaneous position of the source of sound, a pointer mark freely rotatable in all directions around the centre of the hemispherical surface, a slotted yoke concentric to the centre of the hemispherical surface fixed to the said freely rotatable pointer mark and engaged by the pointer mark on the said other radial arm, the freely rotatable pointer mark being adjustable to be brought into coincidence with the pointer mark on the said other radial arm, and means for indicating the altitude and azimuth of the said freely rotatable pointer mark.

16. An apparatus for determining the instantaneous position of an invisible moving source of sound comprising means for mechanically representing, on a reduced scale, the triangle formed by a central observation station, the acoustic position, and the true position of the source of sound, said means including a member having a spherical surface the centre of which represents the central station, and the two representations of the two sides of the said represented triangle, intersecting in the centre of the said spherical surface, being supported to turn around the said centre in all directions, the constant length of one side of this represented triangle representing the straight line connecting the central observation station with the acoustic position of the source of sound corresponding to the velocity of propagation of sound waves, the other side of the represented triangle representing the straight line connecting the acoustic and the true position of the source of sound corresponding to the speed of the source of sound, and the third side of the represented triangle indicating the direction from the central station to the true position of the source of sound, in combination with a arm supported to turn around the centre of the said spherical surface in all directions, a pointer mounted on such arm, means for varying the altitude and the azimuth angular positions of the said arm, whereby its pointer may be brought into coincidence with the point representing the true position of the source of sound, optical observation instruments, and means for transmitting the altitude and azimuth angles of said pointer to said instrument.

In testimony whereof I have affixed my signature.

KARL PETSCHENIG.